United States Patent [19]
Weichelt et al.

[11] Patent Number: 6,018,437
[45] Date of Patent: Jan. 25, 2000

[54] DISC DRIVE SERVO WRITER SUPPORT ASSEMBLY

[75] Inventors: Brent M. Weichelt, Burnsville; Mark A. Toffle, St. Louis Park; Lon R. Buske, Apple Valley, all of Minn.

[73] Assignee: Seagate Technology, Inc., Scotts Valley, Calif.

[21] Appl. No.: 09/084,148

[22] Filed: May 26, 1998

Related U.S. Application Data

[60] Provisional application No. 60/062,474, Oct. 16, 1997.

[51] Int. Cl.[7] .................................................. G11B 5/012
[52] U.S. Cl. ....................................................... 360/97.01
[58] Field of Search ............................. 360/97.01–97.04, 360/98.01

[56] References Cited

U.S. PATENT DOCUMENTS 5,349,486  9/1994  Sugimoto et al. .................... 360/97.01

*Primary Examiner*—Allen T. Cao
*Attorney, Agent, or Firm*—Westman, Champlin & Kelly, P.A.

[57] ABSTRACT

A servo writer support assembly supports a disc drive storage device relative to an orthogonal coordinate system comprising X, Y and Z axes during servo writing. The support assembly includes a support body, a yaw registration feature, a pitch registration feature and a locating post. The yaw registration feature is engageable with the disc drive storage device for limiting rotation of the disc drive storage device about the Z axis. The pitch registration feature is engageable with the disc drive storage device for limiting rotation of the disc drive storage device about the X and Y axes. The locating post extends from the support body parallel to the Z axis and includes a registration surface having a tangent that is oblique to the Z axis. The registration surface is engageable with the disc drive storage device for limiting translational movement of the disc drive storage device along the X, Y and Z axes.

18 Claims, 4 Drawing Sheets

DISC DRIVE SERVO WRITER SUPPORT ASSEMBLY

CROSS REFERENCE TO RELATED APPLICATION

This application claims the benefit of U.S. Provisional Application Ser. No. 60/062,474, entitled "SERVO TRACK WRITER HEAD DISC ASSEMBLY SPINDLE SUPPORT," filed Oct. 16, 1997.

BACKGROUND OF THE INVENTION

The present invention relates to disc drive data storage systems and, more particularly, to a support assembly for precisely locating a disc drive module during servo track writing.

A typical disc drive storage system includes one or more magnetic discs which are mounted for co-rotation on a hub or spindle. A typical disc drive also includes a transducer supported by a hydrodynamic bearing which flies above each magnetic disc. The transducer and the hydrodynamic bearing are collectively referred to as a data head. A drive controller is conventionally used for controlling the disc drive based on commands received from a host system. The drive controller controls the disc drive to retrieve information from the magnetic discs and to store information on the magnetic discs. An electromechanical actuator operates within a negative feedback, closed-loop servo system to move the data head radially or linearly over the disc surface for track seek operations and holds the transducer directly above a desired track or cylinder on the disc surface for track following operations.

Information is typically stored in concentric tracks on the surface of the magnetic discs by providing a write signal to the data head to encode flux reversals on the surface of the magnetic discs representing the data to be stored. In retrieving data from the discs, the drive controller controls the electromechanical actuator so that the data head flies above the desired track or cylinder on the magnetic discs, sensing the flux reversals on the magnetic discs, and generating a read signal based on those flux reversals.

In an embedded servo-type system, servo information or (servo bursts) is recorded on data tracks which also contain stored data. The servo bursts are typically temporally spaced evenly about the circumference of each data track. Data is recorded on the data tracks between the servo bursts. In a dedicated servo-type system, an entire disc surface in a disc drive is dedicated to storing the servo information.

As the data head reads the servo information, the transducer provides a position signal which is decoded by a position demodulator and presented in digital form to a servo control processor. The servo control processor essentially compares actual radial position of the transducer over the disc (as indicated by the embedded servo burst) with a desired position and commands the actuator to move in order to minimize position error.

The servo information is written on the disc surfaces during manufacture of the disc drive module. Each disc drive module is mounted to a servo writer support assembly which precisely locates the disc surfaces relative to a reference or origin. The servo writer support assembly supports a position sensor, such as laser light interferometer, which detects the position of the actuator relative to the disc surfaces. The position sensor is electrically inserted within the disc drive's negative feedback, closed-loop servo system for providing position information to the servo system while the servo data is being written to the disc surfaces. The servo writer support assembly may also support a clock writer transducer which writes a clock pattern onto the disc surface which is used for temporally spacing the servo data about the circumference of each track.

Vibration caused by disc rotation, operation of the spindle motor and actuator movement results in vibration of the disc drive module relative to the servo writer support assembly. The vibration is fed back through the closed-loop servo system as part of the position error signal generated by the actuator position sensor and results in inaccurate servo information being written to the disc surface. Inaccurate servo information limits the ability of the electromechanical actuator to accurately position the data head directly over the desired data track during normal track following operations.

It is therefore desirable for the servo writer support assembly to provide structural and electrical integrity for minimizing the generation of vibrations and the effect of those vibrations on the quality of the servo information that is recorded on the disc surfaces, especially in high aerial density applications. It is also desirable for the servo writer support assembly to provide an interface that supports high volume, automated, manufacturing processes.

The present invention addresses these and other problems, and offers other advantages over the prior art.

SUMMARY OF THE INVENTION

The servo writer support assembly of the present invention supports a disc drive storage device relative to an orthogonal coordinate system comprising X, Y and Z axes during servo writing. In one aspect of the present invention, the support assembly includes a support body, a yaw registration feature, a pitch registration feature and a locating post. The yaw registration feature is engageable with the disc drive storage device for limiting rotation of the disc drive storage device about the Z axis. The pitch registration feature is engageable with the disc drive storage device for limiting rotation of the disc drive storage device about the X and Y axes. The locating post extends from the support body parallel to the Z axis and includes a registration surface having a tangent that is oblique to the Z axis. The registration surface is engageable with the disc drive storage device for limiting translational movement of the disc drive storage device along the X, Y and Z axes.

Another aspect of the present invention relates to a method of locating a disc drive storage device on a servo writer support assembly. The method includes limiting rotation of the disc drive storage device about the Z axis relative to the servo writer support assembly; limiting rotation of the disc drive storage device about the X and Y axes relative to the servo writer support assembly; and engaging the disc drive storage device with the servo writer support assembly along an oblique registration surface relative to the Z axis such that translational movement of the disc drive storage device along the X, Y and Z axes is limited.

Yet another aspect of the present invention relates to a servo data writing apparatus including a disc drive and a support body. The disc drive includes a spindle motor axis and a registration feature which is coaxial with the spindle motor axis. The support body engages the registration feature about the spindle motor axis to limit translational movement of the disc drive along the X, Y and Z axes.

DETAILED DESCRIPTION OF THE PREFERRED EMBODIMENTS

Figure 1:
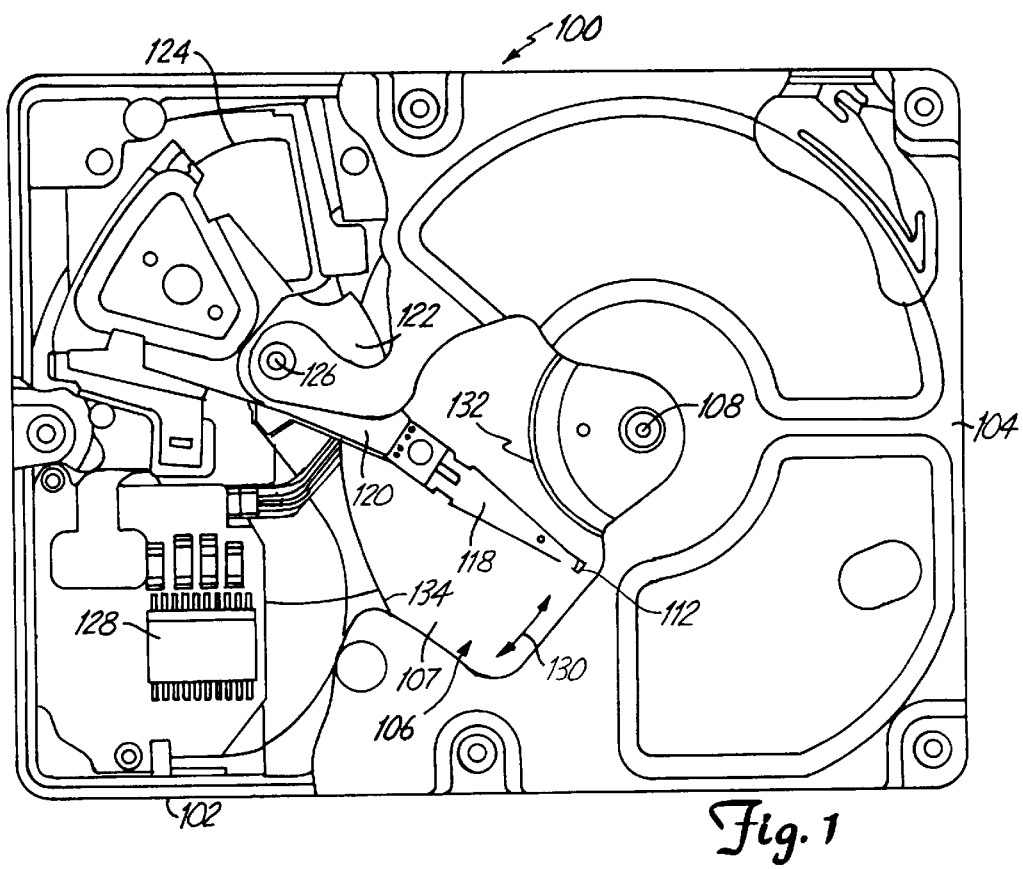
FIG. 1 is a plan view of a disc drive.

FIG. 1 is a plan view of a disc drive 100 which includes a housing with a base 102 and top cover 104 (sections of top cover 104 are removed for clarity). Disc drive 100 further includes a disc pack 106 which is mounted on a spindle motor (not shown). Disc pack 106 includes a plurality of individual discs 107 which are mounted for co-rotation about central axis 108. Each disc 107 has an associated head 112 which carries one or more read and write transducers for communicating with the disc surface. Each head 112 is supported by a suspension 118 which is in turn attached to a track accessing arm 120 of an actuator assembly 122.

Actuator assembly 122 is rotated about a shaft 126 by a voice coil motor 124, which is controlled by servo control circuitry within internal circuit 128, to move head 112 travels in an arcuate path 130 between a disc inner diameter 132 and a disc outer diameter 134. In one embodiment, servo information is embedded in the data tracks on each disc surface of disc pack 106. Data is recorded in the data tracks between the servo bursts. In another embodiment, one of the disc surfaces is dedicated to storing the servo information. As actuator assembly 122 positions head 112 over a desired data track, the read transducer in head 112 reads the stored information from the disc surface. The servo control circuitry within internal circuit 128 compares the recovered, embedded or dedicated servo information with a desired radial position for head 112 and commands actuator assembly 122 to move in order to minimize position error.

Figure 2:
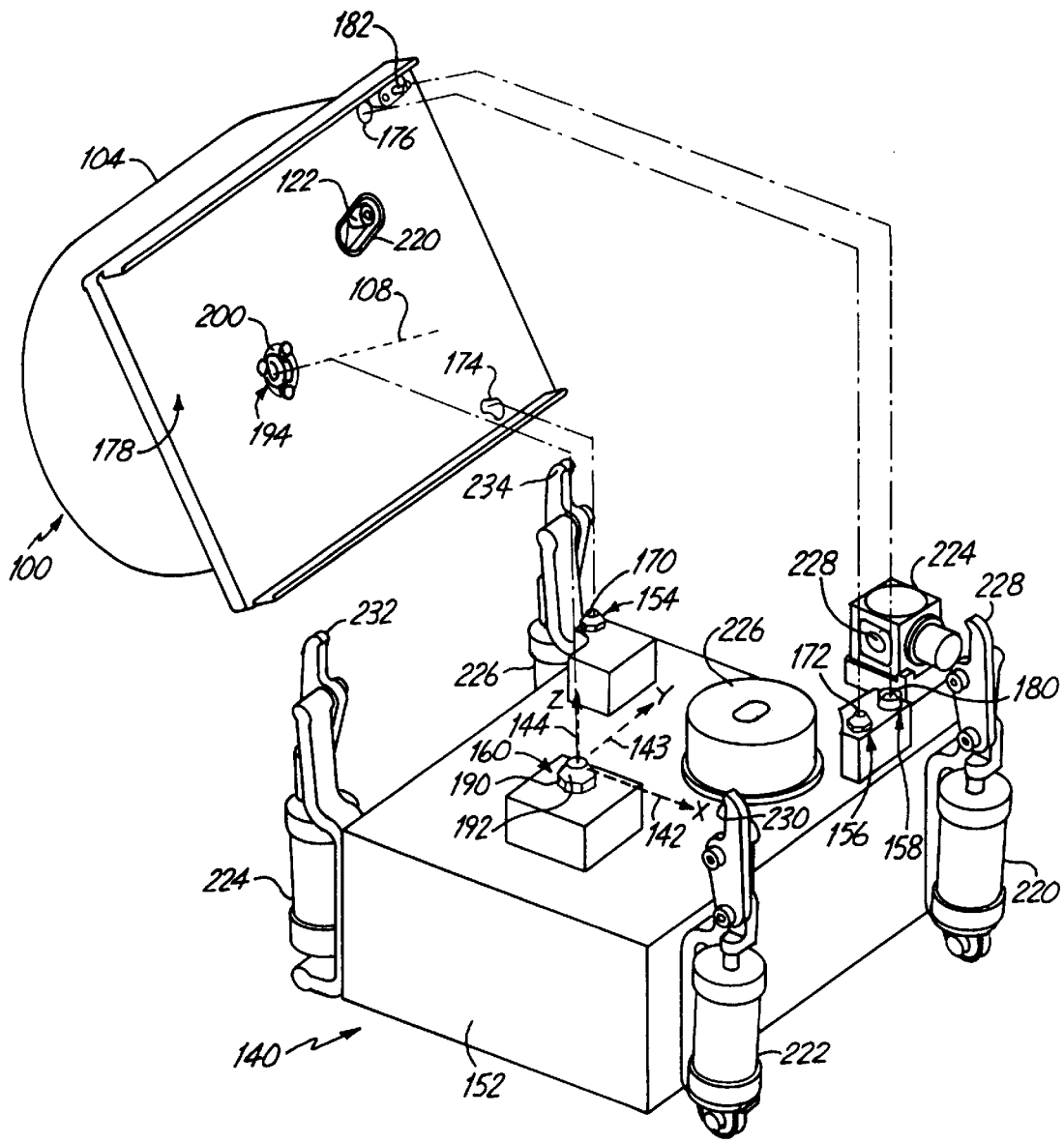
FIG. 2 is a perspective view of a servo writer support assembly for supporting the disc drive shown in FIG. 1 according to one embodiment of the present invention.

FIG. 2 is a perspective view of a servo writer support assembly 140 according to one embodiment of the present invention for supporting disc drive 100 while the servo information is written on the surfaces of discs 107 during manufacture. When disc drive 100 is mounted to support assembly 140, support assembly 140 precisely locates the disc surfaces relative to an orthogonal coordinate system defined by X axis 142, Y axis 143 and Z axis 144 and minimizes vibrations generated at the structural interface between disc drive 100 and support assembly 140.

Support assembly 140 includes support body 152, pitch registration features 154 and 156, yaw registration feature 158 and X, Y and Z translational movement registration feature 160. Pitch registration features 154 and 156 include machined datum surfaces 170 and 172, respectively, which lie in planes parallel to X axis 142 and Y axis 143 and at a selected location along Z axis 144. The Z axis location is preferably defined relative to a selected reference surface on disc pack 106 (shown in FIG. 1). Pitch registration features 154 and 156 can include any structure such as a head, post or other controlled-height surface for engaging complementary machined datum surfaces 174 and 176 extending from a lower surface 178 of disc drive 100. When disc drive 100 is mounted on support assembly 140, machined datum surfaces 174 and 176 rest on surfaces 170 and 172, respectively, of pitch registration features 154 and 156 to thereby limit rotational movement of disc drive 100 about X axis 142 and Y axis 143.

Yaw registration feature 158 includes a recess 180, such as that formed by a raised cylindrical standoff. Recess 180 is adapted to receive a complementary locating pin 182 extending from lower surface 178 of disc drive 100 to thereby limit rotational movement of disc drive 100 about Z axis 144. In an alternative embodiment (not shown), yaw registration feature 158 includes a locating pin, and disc drive 100 includes a complementary recess for receiving the locating pin. Other structures can also be used.

X, Y and Z translational movement registration feature 160 includes a raised spindle locating post 190 which extends from support body 152 in a direction parallel to Z axis 144 and has a tapered or chamfered registration surface 192. In the embodiment shown in FIG. 2, registration surface 192 is generally convex and has a frustal conical shape in which opposing sides on registration surface 192 diverge from one another along Z axis 144. Spindle locating post 190 is positioned on support body 152 relative to registration features 154, 156 and 158 such that spindle locating post 190 aligns with spindle motor axis 108 on disc drive 100.

Disc drive 100 includes a complementary registration feature 194 in the form of a recess or aperture which is preferably arranged about and coaxial with spindle motor axis 108. Registration feature 194 has an inner circumferential edge 200 which engages registration surface 192 on support body 152 when disc drive 100 is mounted on support assembly 140. In a preferred embodiment, inner circumferential edge 200 is chamfered. Inner circumferential edge 200 engages registration surface 192 about a contact arc around the circumference of registration surface 192. Preferably, registration surface 192 and complementary registration feature 194 have circular cross-sections in a plane parallel to X and Y axes 142 and 143. However, other shapes can also be used. For example, inner circumferential edge 200 may engage registration surface 192 along a contact ellipse, along a plurality of line segments or on a plurality of discrete contact points or surfaces. Registration feature 194 on disc drive 100 provides opposing contact surfaces for engaging registration surface 192 on locating post 190. These contact surfaces can be formed of a single annular surface as in FIG. 2, or of a plurality of discrete surfaces arranged around spindle motor axis 108.

In each embodiment, registration surface 192 limits translational movement of disc drive 100 along X axis 142, Y axis 143 and Z axis 144. The height of disc drive 100 along Z axis 144 relative to support body 152 is defined by the height of spindle locating post 190, the angle and depth of the chamfer on registration surface 192 and the size and shape of inner circumferential edge 200. The height of datum surfaces 170 and 172 along Z axis 144 determine the pitch of disc drive 100 relative to spindle locating post 190.

Clamps 220, 222, 224 and 226 are secured to support body 152 and include cantilevered lips 228, 230, 232 and 234, respectively, for engaging top cover 104 of disc drive 100. In one embodiment, clamps 220, 222, 224 and 226 are controlled by a pneumatic pump (not shown) which, when activated, pulls lips 228, 230, 232 and 234 downward along Z axis 144 toward support body 152 for rigidly securing disc drive 100 to support body 152 and thereby accurately defining the X, Y and Z locations of disc drive 100 on registration features 154, 156, 158 and 160.

Once disc drive 100 is secured to servo writer support assembly 140, servo information is written to the surfaces of discs 107. Disc drive 100 has an aperture 220 through which the position of actuator assembly 122 and thus head 112 can be monitored. In one embodiment, the position of actuator assembly 122 is monitored by a single-beam laser interferometer 224 and an optical reflector assembly 226 which are mounted on support body 152. Optical reflector assembly 226 carries a corner cube (not shown) which attaches to actuator assembly 122 through aperture 220. Interferometer 224 directs a laser beam through window 228 toward the corner cube in optical reflector assembly 226. The laser beam reflects off of the corner cube and returns to interferometer 224 through window 228.

As actuator assembly 122 rotates about its axis 126 (shown in FIG. 1), the position of the corner cube relative to interferometer 224 changes, which changes the length of the laser beam travel path and thus the phase of the return laser beam relative to a reference beam generated by interferometer 224. A receiver (not shown) compares the return laser beam and the reference beam and generates a position error signal representative of the actuator's position. The error signal is then electrically inserted within the disc drive's negative feedback, closed-loop servo system for providing position information to the servo system while the servo data is being written to the disc surfaces. Other types of actuator position sensors may also be used in alternative embodiments.

Vibrations between disc drive 100 and servo writer support assembly 140 are fed back to disc drive 100 through the position error signal derived through interferometer 224. By reducing the amplitude of these vibrations, servo writer support assembly 140 allows for more accurate servo information to be written to the surfaces of discs 107 (shown in FIG. 1).

It has been found that aligning locating post 190 with spindle motor axis 108 results in the largest reduction in the amplitude of vibrations between disc drive 100 and support assembly 140 by precisely defining and securing the location of the spindle motor mount. In alternative embodiments, locating post 190 can be aligned with actuator axis 126 (shown in FIG. 1). Reducing the amplitude of vibrations results in more accurate servo information being written to the surfaces of discs 107 during manufacture.

Figure 3:
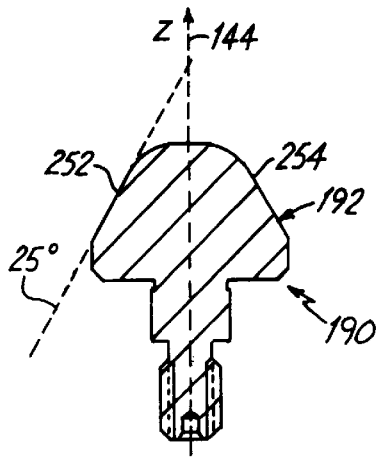
FIG. 3 is a cross-sectional view of a spindle locating post of the servo writer support assembly, taken along a Z axis.
Figure 4:
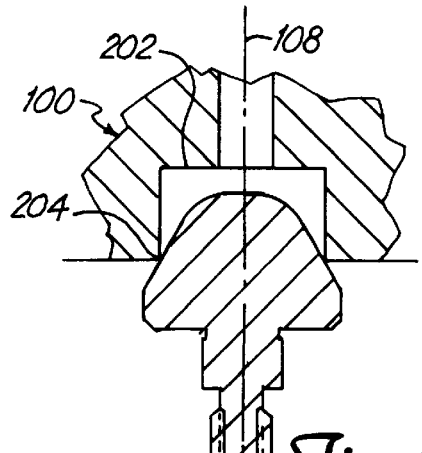
FIG. 4 is a cross-sectional view of the spindle locating post engaged with the disc drive along its spindle motor axis.

FIG. 3 is a cross-sectional view of spindle locating post 190 taken along Z axis 144. Registration surface 192 has a tangent 250 which is oblique to Z axis 144. With oblique tangent 250, opposing surfaces 252 and 254 of registration surface 192 diverge from one another along Z axis 144, to accurately position disc drive 100 along X axis 142, Y axis 143 and Z axis 144, as shown in FIG. 4.

Figure 5:
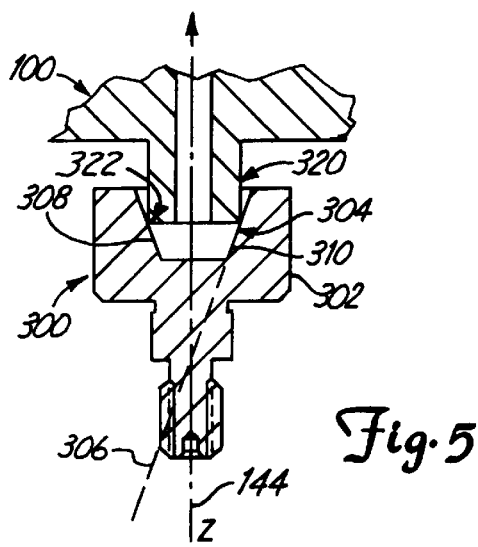
FIG. 5 is a cross-sectional view of an alternative spindle locating post having a generally concave registration surface according to an alternative embodiment of the present invention.

FIG. 5 is a cross-sectional view of an X, Y and Z translational movement registration feature according to an alternative embodiment of the present invention, which is a complement of the embodiment shown in FIGS. 1–4. X, Y and Z translational movement registration feature 300 includes a locating post 302 which has a generally concave, as opposed to convex, registration surface 304. Registration surface 304 has a tangent 306 which is oblique to Z axis 144, causing opposing surfaces 308 and 310 of registration surface 304 to diverge from one another along Z axis 144 in a direction toward disc drive 100. In this embodiment, disc drive 100 has a complementary registration feature 320 having an outer diameter edge or surface which engages registration surface 304. The outer diameter edge or surface at corner 322 can have a sharp angle as shown in FIG. 5 or can be rounded or chamfered, for example, in alternative embodiments.

Figure 6:
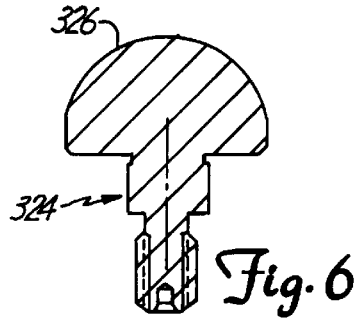
FIGS. 6 and 7 are cross-sectional views of alternative spindle locating posts having outwardly and inwardly curved registration surfaces, respectively.
Figure 7:
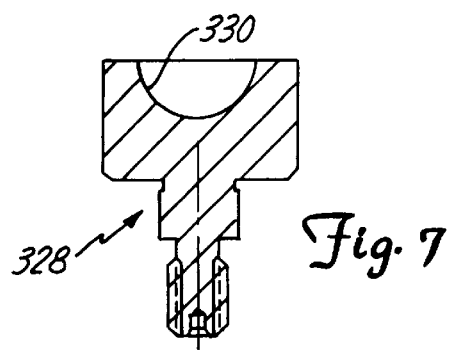

In FIG. 6, spindle locating post 324 has a convex registration surface 326 with a cross section along Z axis 144 that is outwardly curved, such as on the outer surface of a sphere. In FIG. 7, spindle locating post 328 has a registration surface 330 with a cross section along Z axis 144 that is inwardly curved, such as on the inner surface of a sphere.

Figure 8:
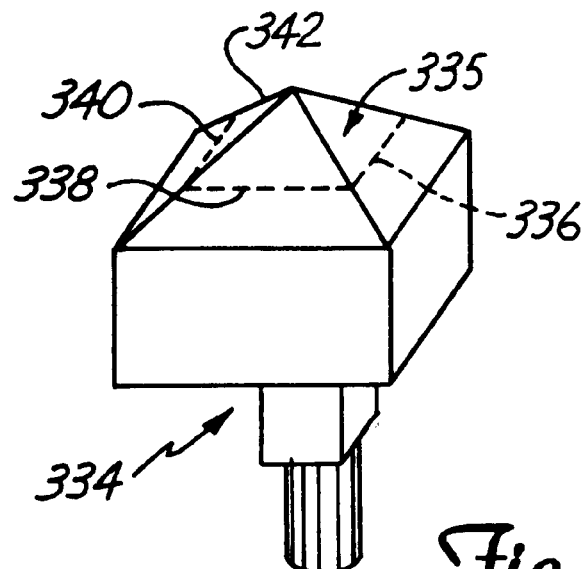
FIGS. 8 and 9 are perspective views of alternative spindle locating posts having a generally pyramidal-shaped registration surface.
Figure 9:
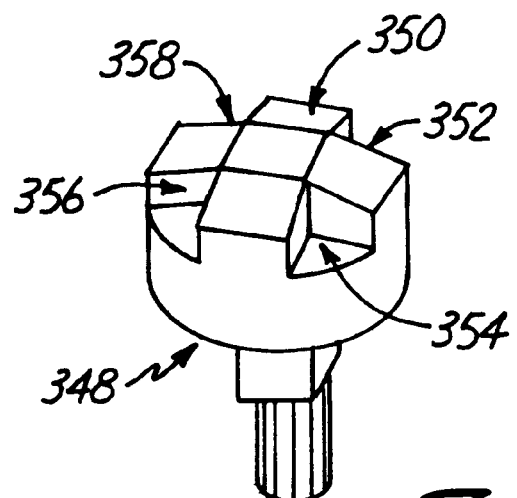

FIG. 8 is a perspective view of a spindle locating post 334 having a pyramidal-shaped registration surface 335. In this embodiment, disc drive 100 engages registration surface 335 along contact lines 336, 338, 340 and 342 (342 not shown). FIG. 9 is a perspective view of a spindle locating post 348 having a frustal pyramidal-shaped registration surface 350. In addition, cut-outs 352, 354, 356 and 358 are formed at the corners of the pyramid. In this embodiment, disc drive 100 engages registration surface 350 along contact lines 360, 362, 364 and 366.

With a single registration surface providing an X, Y and Z locating function about the spindle motor axis, the servo writer support assembly of the present invention provides the structural integrity necessary to support high aerial density recording while providing the type of interface necessary for high volume, automated manufacturing processes.

One aspect of the present invention relates to a servo writer support assembly 140 for supporting a disc drive storage device 100 relative to an orthogonal coordinate system comprising X, Y and Z axes during servo writing. The support assembly 140 includes a support body 152, a yaw registration feature 158, a pitch registration feature 154, 156 and a locating post 190, 302, 324, 328, 334 and 348. The yaw registration feature 158 is engageable with the disc drive storage device 100 for limiting rotation of the disc drive storage device 100 about the Z axis. The pitch registration feature 154, 156 is engageable with the disc drive storage device 100 for limiting rotation of the disc drive storage device about the X and Y axes. The locating post 190, 302, 324, 328, 334 and 348 extends from the support body parallel to the Z axis and includes a registration surface 192, 252, 254, 308, 310, 326, 330, 335 and 348 having a tangent that is oblique to the Z axis. The registration surface 192, 252, 254, 308, 310, 326, 330, 335 and 348 is engageable with the disc drive storage device 100 for limiting translational movement of the disc drive storage device along the X, Y and Z axes.

In one preferred embodiment, the registration surface 192, 252, 254, 326, 335 and 348 has a generally convex cross-section taken along the Z axis which may be curved (326), frustal conical (192) or pyramidal (335 and 348), for example. Other shapes can also be used.

Another aspect of the present invention relates to a method of locating a disc drive storage device 100 on a servo writer support assembly 140. The method includes limiting rotation of the disc drive storage device 100 about the Z axis relative to the servo writer support assembly 140; limiting rotation of the disc drive storage device 100 about the X and Y axes relative to the servo writer support assembly 140; and engaging the disc drive storage device 100 with the servo writer support assembly 140 along an oblique registration surface 192, 252, 254, 308, 310, 326, 330, 335 and 348 relative to the Z axis such that translational movement of the disc drive storage device 100 along the X, Y and Z axes is limited.

Yet another aspect of the present invention relates to a servo data writing apparatus including a disc drive 100 and a support body 152. The disc drive 100 includes a spindle motor axis 108 and a registration feature 194 which is coaxial with the spindle motor axis 108. The support body 152 engages the registration feature 194 about the spindle motor axis 108 to limit translational movement of the disc drive 100 along the X, Y and Z axes.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular locating features may vary depending on the particular application or drive module with which the servo writer support assembly is used while maintaining substantially the same functionality without departing from the scope and spirit of the present invention. In addition, although the preferred embodiment described herein is directed to a disc drive having a magnetic head, it will be appreciated by those skilled in the art that the teachings of the present invention can be applied to other technologies, like optical systems, without departing from the scope and spirit of the present invention.

What is claimed is:

1. A servo writer support assembly for supporting a disc drive storage device relative to an orthogonal coordinate system comprising X, Y and Z axes during servo writing, the support assembly comprising:
   a support body;
   a yaw registration feature on the support body which is engageable with the disc drive storage device for limiting rotation of the disc drive storage device about the Z axis;
   a pitch registration feature on the support body which is engageable with the disc drive storage device for limiting rotation of the disc drive storage device about the X and Y axes; and
   a locating post extending from the support body parallel to the Z axis which comprises a registration surface having a tangent that is oblique to the Z axis and is engageable with the disc drive storage device for limiting translational movement of the disc drive storage device along the X, Y and Z axes.

2. The servo writer support assembly of claim 1 wherein the registration surface has a generally convex cross-section taken along the Z axis.

3. The servo writer support assembly of claim 2 wherein the registration surface has a frustal conical shape.

4. The servo writer support assembly of claim 2 wherein the registration surface has a pyramidal shape.

5. The servo writer support assembly of claim 1 wherein the registration surface has a generally concave cross-section taken along the Z axis.

6. The servo writer support assembly of claim 1 wherein the registration surface comprises a plurality of opposing surfaces that diverge from one another along the Z axis.

7. The servo writer support assembly of claim 1 wherein the registration surface defines a disc drive contact arc lying in a plane defined by the X and Y axes.

8. The servo writer support assembly of claim 1 wherein:
   the registration surface defines a first disc drive contact location along the Z axis; and
   the pitch registration feature comprises a machined datum surface parallel to the X and Y axes which defines a second disc drive contact location along the Z axis.

9. The servo writer support assembly of claim 1 wherein:
   the pitch registration feature comprises first and second machined datum surfaces parallel to the X and Y axes which define first and second disc drive contact locations along the Z axis.

10. The servo writer support assembly of claim 1 wherein the yaw registration feature comprises a pin extending from the support body parallel to the Z axis which is engageable with a complementary engagement feature in the disc drive storage device.

11. The servo writer support assembly of claim 1 wherein the yaw registration feature comprises an aperture extending into the support body parallel to the Z axis which is engageable with a complementary engagement feature in the disc drive storage device.

12. The servo writer support assembly of claim 1 and further comprising a clamp attached to the support body which is engageable with the disc drive storage device for securing the servo writer support assembly to disc drive storage device along the Z axis.

13. A method of locating a disc drive storage device on a servo writer support assembly relative to an orthogonal coordinate system comprising X, Y and Z axes during servo writing, the method comprising:
   limiting rotation of the disc drive storage device about the Z axis relative to the servo writer support assembly;
   limiting rotation of the disc drive storage device about the X and Y axes relative to the servo writer support assembly; and
   engaging the disc drive storage device with the servo writer support assembly along a registration surface between the disc drive storage device and the servo writer support assembly, which is oblique relative to the Z axis such that translational movement of the disc drive storage device along the X, Y and Z axes is limited.

14. The method of claim 13 wherein the disc drive storage device has a spindle motor axis, the oblique registration surface is formed on a locating post extending from the servo writer support assembly in a direction parallel to the Z axis and the step of engaging the disc drive storage device comprises:
   aligning the locating post with the spindle motor axis; and
   inserting the locating post between opposing contact surfaces on the disc drive storage device until the oblique registration surface engages the opposing contact surfaces about the spindle motor axis.

15. The method of claim 13 wherein the disc drive storage device has a actuator rotational axis, the oblique registration surface is formed on a locating post extending from the servo writer support assembly in a direction parallel to the Z axis and the step of engaging the disc drive storage device comprises:
   aligning the locating post with the actuator rotational axis; and
   inserting the locating post between opposing contact surfaces on the disc drive storage device until the oblique registration surface engages the opposing contact surfaces about the actuator rotational axis.

16. The method of claim 13 wherein the oblique registration surface is defined by a frustal conical locating post extending from the servo writer support assembly in a direction parallel to the Z axis, the disc drive storage device comprises opposing contact surfaces, and the step of engaging the disc drive storage device comprises:

aligning the frustal conical locating post between the opposing contact surfaces;

inserting the frustal cone between the opposing contact surfaces until the oblique registration surface contacts the opposing contact surfaces and thereby limits movement of the disc drive storage device along the X, Y and Z axes.

17. The method of claim 13 wherein the oblique registration surface comprises a locating post having a plurality of opposing contact surfaces that diverge from one another along the Z axis, the disc drive storage device comprises opposing contact surfaces, and the step of engaging the disc drive storage device comprises:

aligning the locating post with the recess such that the plurality of opposing surfaces contact the inner circumferential edge and thereby limit movement of the disc drive storage device along the X, Y and Z axes.

18. A servo data writing apparatus comprising:

a disc drive comprising a spindle motor axis and a registration feature which is coaxial with the spindle motor axis; and a servo data writer support body comprising means for engaging the registration feature about the spindle motor axis to limit translational movement of the disc drive along X, Y and Z axes of an orthogonal coordinate system relative to the servo data writer support body.

* * * * *